(12) United States Patent
Van Gen

(10) Patent No.: US 6,535,750 B1
(45) Date of Patent: *Mar. 18, 2003

(54) RADIO APPARATUS, ESPECIALLY A MOBILE TELEPHONE

(75) Inventor: Kay Hassend Van Gen, Kamen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,403

(22) Filed: Nov. 4, 1998

(30) Foreign Application Priority Data

Nov. 6, 1997 (DE) .......................... 197 49 069

(51) Int. Cl.[7] .............................. H04B 1/08; H04B 1/38; H04Q 7/20; H04M 1/00
(52) U.S. Cl. ...................... 455/558; 455/347; 455/348; 455/349; 455/425; 455/550; 455/572; 455/90; 455/575; 379/433.01; 379/433.08; 379/433.09
(58) Field of Search ................... 455/90, 558, 572, 455/575, 186.1, 347–349, 425, 550; 235/479; 379/433, 428, 428.01, 433.06, 433.08, 433.09, 433.11, 433.12

(56) References Cited

U.S. PATENT DOCUMENTS 5,790,659 A * 8/1998 Strand ...................... 379/433
5,814,805 A * 9/1998 Reichardt et al. ............ 235/479
5,883,786 A * 3/1999 Nixon ......................... 361/737
5,960,332 A * 9/1999 Michalzik ..................... 455/90

FOREIGN PATENT DOCUMENTS

EP 0 522 762 * 1/1993 ............ H04M/1/72

* cited by examiner

Primary Examiner—Edward F. Urban
Assistant Examiner—Meless Zewdu
(74) Attorney, Agent, or Firm—Michael J. Striker

(57) ABSTRACT

The mobile or portable telephone includes a circuit board (15); a battery compartment (5) for a battery (20) located on a first side of the circuit board (15) and a pivotable card receptacle (10) for a telephone card arranged on the first side of the circuit board (15) next to the battery compartment. The card receptacle (10) is pivotable between a first position (25) in which the telephone card cannot be inserted or removed from the card receptacle when the battery (20) is in the battery compartment (5) and a second position (30) in which the telephone card is insertable or removable from the card receptacle even when the battery (20) is in the battery compartment (5). A button (B) may be provided for activation of the pivoting of the card receptacle into the second position from the first position. The card receptacle (10) preferably locks in the first position (25) when put in the first position and may be unlocked from the first position (25) by operation of the button (B).

2 Claims, 1 Drawing Sheet

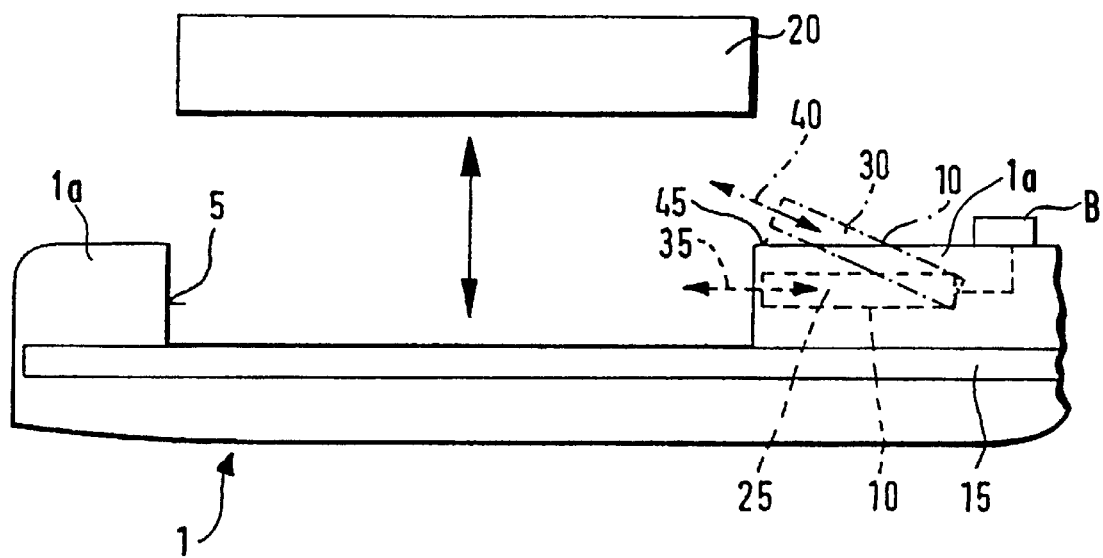

RADIO APPARATUS, ESPECIALLY A MOBILE TELEPHONE

BACKGROUND OF THE INVENTION

1. Field of the Invention

The present invention relates to a radio apparatus, especially to a mobile or portable telephone, with a battery compartment and a card receptacle.

2. Prior Art

A radio device constructed as a mobile telephone including a battery compartment and a telephone card receptacle for a SIM telephone network card (subscriber identification module) is already known from the Bosch Telecom Catalog "Bosch Mobile Telephone 1996/97, Fresh Ideas for Maintaining Connections". The SIM telephone network card allows telephoning in the respective mobile radio network. It contains the personal call number and a protective access authorization code, for example in the form of a four-digit number, whose input to the mobile telephone proves that the user of the telephone network card is authorized to make telephone calls. The SIM telephone network card is also a memory, e.g. for telephone directory entry.

SUMMARY OF THE INVENTION

It is an object of the present invention to provide an improved radio device, especially a mobile or portable telephone, of the above-described type, having a battery compartment and a telephone card receptacle.

According to the invention the compact radio device, especially a mobile or portable telephone, includes a circuit board, a battery compartment for holding a battery that e.g. powers the radio device and a card receptacle for a telephone card, such as a telephone network card, an access authorization card or the like. The battery compartment and the card receptacle are arranged on the same side of the circuit board and along the circuit board next to each other.

The radio device according to the invention with the above-described features has the advantage that the battery compartment and the card receptacle are on the same side of the circuit board and are arranged next to each other on the circuit board. In this way it is possible to reduce the thickness of the radio device. Because of that the user-friendliness of the radio device is increased, since it is more easily gripped by a hand of the user and takes up less space, for example in a jacket pocket.

Especially a reduced thickness or height of the radio device according to the invention results in comparison to an arrangement of the card receptacle between the battery compartment and the circuit board.

An additional advantage of the above-described arrangement is that the arrangement of the battery compartment and the card receptacle next to each other along the circuit board is that the battery compartment and the card receptacle are simultaneously accessible from outside in contrast to the situation with the card receptacle between the battery compartment and the circuit board and the card receptacle thus is accessible from the outside only with the battery removed from the battery compartment. The insertion or removal of a telephone network card or an access authorization card into or out of the card receptacle is thus considerably simplified for the user.

The features of an advantageous embodiment of the radio device according to the invention are set forth in the appended dependent claims.

The card receptacle is advantageously only accessible from the battery compartment with the battery removed. By removing the battery it is guaranteed that no voltage is present in the radio device when the card is inserted in it. Because of that damage to the radio device and/or the card is prevented. Furthermore a telephone network card inserted in the card receptacle or access authorization card is better protected from unintended loss or dropping out from the radio device, since it is only insertable or removable with the battery removed from the battery compartment. At the same time with this arrangement a telephone network card or access authorization card inserted in the card receptacle is better protected from outside influences, such as weather influences, impacts or the like. Furthermore by the arrangement of the battery compartment and the card receptacle along the circuit board on one side a hinge visible from the outside can be dispensed with, whereby the outer appearance of the radio device is not made to look poorer or interrupted.

BRIEF DESCRIPTION OF THE DRAWING

The objects, features and advantages of the invention will now be illustrated in more detail with the aid of the following description of the preferred embodiments, with reference to the accompanying drawing in which the sole FIGURE is a side view of the radio device according to the invention.

DESCRIPTION OF THE PREFERRED EMBODIMENTS

The radio device shown in the sole FIGURE is, for example, a mobile telephone. However the radio device 1 could also be a cordless telephone, a portable radio unit, a voice radio unit or the like. The radio device 1 has a housing 1a, a circuit board 15 within the housing, a battery chamber or battery compartment 5 in the housing and a card receptacle 10 for receiving a telephone network card, an access code card or the like. The telephone network card can be a SIM telephone card (Subscriber Identification Module). This type of subscriber identification module card allows the telephoning in a respective network, contains a call number of the radio unit 1 and a protective access code, for example in the form of a four-digit number, whose insertion through an upper surface of the radio device proves that the user of the SIM telephone network card is authorized to make telephone calls. It can also include a memory, e.g. for recording telephone directory entries. The SIM telephone network card is also preferably a chip, but can alternatively or additionally include a magnetic strip or other similar memory module. An unshown card reading device is provided for reading the telephone network card, access code card or the like inserted in the card receptacle 10.

The battery compartment 5 and the card receptacle 10 are arranged in the housing 1a of the mobile telephone on the same side of the circuit board 15 as shown in the drawing. The battery compartment 5 and the card receptacle 10 are arranged next to each other along the circuit board 15.

Two different main embodiments are possible for formation of the card receptacle 10. First the card receptacle 10 can be formed so that it is accessible from the outside only after removal of a battery 20 from the battery compartment 5. The card receptacle 10 is arranged in a first position 25 in a plane that extends approximately parallel to the circuit board 15 so that inserting and removing the card according to a first double arrow 35 is only possible through the neighboring battery compartment 5. Thus when the battery 20 is inserted in the battery compartment 5 the card receptacle 10 is not accessible for inserting or removing the card through the battery compartment in its first position 25.

In a second embodiment the card receptacle 10 in the radio device 1 can be pivoted out from the housing 1a, i.e. from the first position 25 to a second position 30, so that insertion or removal of the card into or from the card receptacle 10 in the directions indicated by the double arrow 40 is possible in the second position, even with the battery 20 inserted in the battery compartment 5, since the card receptacle or socket 10 is accessible in the second position 30 from above an upper surface 45 of the housing 1a, but not via the battery compartment 5.

The card receptacle or socket 10, for example, can be in the form of a drawer, so that the insertion or removal of a telephone card, such as telephone network card, an access authorization card or the like, to or from the card receptacle 10 is easy for the user. If necessary an ejection mechanism can also be provided for the card receptacle 10, which for example conveys an inserted card by pressure on the card receptacle 10 into a card removal position, from which it can be easily removed by the user. A button B (see figure) accessible from the outside can, for example, be provided for the pivoting motion required of the card receptacle 10 for insertion or removal of the card in the second embodiment. The card receptacle 10 can be pivoted from the second position 30 into the first position 25, for example, by the user pressing in the card receptacle 10 from the second position 30 to the first position 25, whereby the card receptacle 10 then locks into the first position 25.

Since the card receptacle or socket 10 currently has a spatial requirement of about 3 mm in thickness, a saving in thickness of the radio device 1 in contrast to an arrangement of the card receptacle between the circuit board 15 and the battery compartment 5 of about 3 mm in thickness is provided.

The disclosure in German Patent Application 197 49 069.7-31 of Nov. 6, 1997 is incorporated here by reference. This German Patent Application describes the invention described hereinabove and claimed in the claims appended hereinbelow and provides the basis for a claim of priority for the instant invention under 35 U.S.C. 119. While the invention has been illustrated and described as embodied in a radio apparatus, especially a portable telephone, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A mobile or portable telephone comprising
   a housing having an outer surface;
   a circuit board arranged within the housing;
   a battery compartment for a battery, said battery compartment being located in the housing and on a first side of said circuit board;
   a pivotable card receptacle for a telephone card arranged in the housing and on said first side of said circuit board next to said battery compartment; and
   a button for pivoting said card receptacle, said button being accessible from outside of said housing;
   wherein said card receptacle is pivotable by means of said button from a first position under the outer surface of the housing in which said telephone card cannot be inserted or removed from said card receptacle, when said battery is in said battery compartment, to a second position in which said card receptacle extends outside of said housing so that said telephone card is insertable or removable from said card receptacle, when said battery is in said battery compartment; but wherein said telephone card can be inserted or removed from said card receptacle in both said first position and said second position when said battery is not in said battery compartment.

2. The mobile or portable telephone as defined in claim 1, wherein the card receptacle locks in said first position when put in said first position by pressing said card receptacle into said first position and is unlocked from said first position by means of said button.

\* \* \* \* \*